US011379233B2

(12) United States Patent
Horsnell et al.

(10) Patent No.: US 11,379,233 B2
(45) Date of Patent: Jul. 5, 2022

(54) APPARATUS AND DATA PROCESSING METHOD FOR TRANSACTIONAL MEMORY (71) Applicant: Arm Limited, Cambridge (GB)

(72) Inventors: Matthew James Horsnell, Cambridge (GB); Richard Roy Grisenthwaite, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/269,216

(22) PCT Filed: Oct. 17, 2019

(86) PCT No.: PCT/GB2019/052967
§ 371 (c)(1),
(2) Date: Feb. 17, 2021

(87) PCT Pub. No.: WO2020/109749
PCT Pub. Date: Jun. 4, 2020

(65) Prior Publication Data
US 2021/0271485 A1  Sep. 2, 2021

(30) Foreign Application Priority Data
Nov. 28, 2018 (GB) ..................... 1819348

(51) Int. Cl.
*G06F 9/30* (2018.01)
*G06F 9/46* (2006.01)
*G06F 9/38* (2018.01)

(52) U.S. Cl.
CPC ........ *G06F 9/3004* (2013.01); *G06F 9/30087* (2013.01); *G06F 9/3834* (2013.01); *G06F 9/467* (2013.01)

(58) Field of Classification Search
CPC .. G06F 9/3004; G06F 9/30087; G06F 9/3834; G06F 9/467
See application file for complete search history.

(56) References Cited

U.S. PATENT DOCUMENTS

2007/0260942 A1* 11/2007 Rajwar ............... G06F 13/1626
714/54
2013/0339674 A1  12/2013 Greiner et al.
(Continued)

OTHER PUBLICATIONS

"z/Architecture Principles of Operation", September, International Business Machines Corporation, Tenth Edition, pp. 5-88 to 5-104 and 7-328 to 7-335 (Year: 2012).*
(Continued)

*Primary Examiner* — Courtney P Carmichael-Moody
(74) *Attorney, Agent, or Firm* — Nixon & Vanderhye P.C.

(57) ABSTRACT

In an apparatus with transactional memory support circuitry, for a first type of transaction started using a first type of transaction start instruction, commitment of results of instructions executed speculatively following the first type of transaction start instruction are prevented until a transaction end instruction is reached. An abort is triggered when a conflict is detected between an address of a memory access from another thread and the addresses tracked for the transaction. For a second type of transaction started using a second type of transaction start instruction, an address of the read operation is marked as trackable whilst an address of a write operation is omitted from being marked as trackable. This allows an apparatus that supports transactional memory to also be used for multi-word address watching.

14 Claims, 5 Drawing Sheets

(56) References Cited

U.S. PATENT DOCUMENTS

| | | |
|---|---|---|
| 2015/0378777 A1 | 12/2015 | Gschwind et al. |
| 2017/0123992 A1 | 5/2017 | Bradbury et al. |
| 2017/0228233 A1* | 8/2017 | Mishaeli ................. G06F 9/485 |
| 2017/0269960 A1* | 9/2017 | Diestelhorst .......... G06F 9/3842 |

OTHER PUBLICATIONS

Robert Bedichek, "Some Efficient Architecture Simulation Techniques," Proceedings of the Winter 1990 USENIX Conference, Jan. 22-26, 1990, 12 pages.
Examination Report for GB Application No. 1819348.2 dated Oct. 1, 2020, 2 pages.
Search Report for GB Application No. 1819348.2 dated May 9, 2019, 4 pages.
International Search Report and Written Opinion of the ISA for PCT/GB2019/052967 dated Jan. 22, 2020, 16 pages.

* cited by examiner

FIG. 3 tstartl

LDX  x0, [A]

LD    x1, [B]

LD    x2, [C]

LD    x3, [D]

⋮

STX  w21, x20, [A]

APPARATUS AND DATA PROCESSING METHOD FOR TRANSACTIONAL MEMORY

This application is the U.S. national phase of International Application No. PCT/GB2019/052967 filed Oct. 17, 2019 which designated the U.S. and claims priority to GB Patent Application No. 1819348.2 filed Nov. 28, 2018, the entire contents of each of which are hereby incorporated by reference.

The present disclosure relates to the field of data processing. More particularly, it relates to transactional memory.

A data processing system may execute a number of threads of data processing. Sometimes, the threads may need to access a shared resource and the nature of the data processing operations may be such that once a thread starts interacting with the shared resource, it may be necessary for a set of operations to complete atomically using the resource without another thread accessing the resource in the meantime.

One technique for handling this conflict between threads may be to use locks to control exclusive access to at least one target resource. For example, when one thread starts accessing data in a particular address region, the thread may set a lock variable to claim ownership of the lock, and then while the lock owning thread has ownership of the lock, other threads checking the lock variable may determine that the lock is already claimed and so may not enter the section of code which interacts with that address region. Such a lock-based approach can be seen as pessimistic in that each thread by default assumes that it cannot enter the section of code which access the shared resource because a conflict with another thread may occur, unless it has ownership of the lock guaranteeing that no conflict can occur. However, often a lock identifier may control exclusive access to a number of resources (e.g. a range of addresses), and so it is not guaranteed that if one thread is accessing certain resources within the set of resources protected by the lock variable, another thread will definitely access the same resource. Hence, a lock-based approach may, in cases where conflicts between threads are rare, lead to a loss of performance because threads may unnecessarily be waiting for the locks to be released before entering the critical section of code which uses the shared resource.

A more optimistic approach for handling conflicts between threads accessing shared resources can be to use transactional memory support. A data processing system may have circuitry to support execution of a transaction within a thread of data processing by the processing circuitry. The transaction may be those instructions of the thread which are executed between a transaction start instruction marking the beginning of the transaction and a transaction end instruction marking the end of the transaction. Between the transaction start and end instructions, the processing circuitry may speculatively execute the intervening instructions and prevent commitment of the results of those speculatively executed instructions until the transaction end instruction is reached. Occurrence of an abort event following execution of the transaction start instruction (but before the transaction end instruction is reached) may result in the transaction being aborted and the speculative results being discarded. There may be a number of reasons for aborting a transaction, but one reason may be a detected conflict with a memory access made by another thread. Hence, with this approach each thread may optimistically start processing the critical section of code assuming that no conflicts with other threads will occur, and then if the end of the critical section is reached without any conflict being detected the results of the transaction can be committed. In cases where conflict is rare, using transactional memory support can improve performance by allowing more threads to concurrently process their critical sections of code.

In one example embodiment described herein there is an apparatus comprising: an instruction decoder to decode instructions; processing circuitry to perform data processing in response to the instructions decoded by the instruction decoder; transactional memory support circuitry to support execution of a transaction within a thread of data processing by the processing circuitry, the transactional memory support circuitry comprising address tracking circuitry to track addresses accessed by instructions within the transaction; for a first type of transaction started using a first type of transaction start instruction, the instruction decoder is configured to control the processing circuitry to prevent commitment of results of instructions executed speculatively following the first type of transaction start instruction until a transaction end instruction is reached, in which the transactional memory support circuitry is configured to trigger an abort of the transaction when a conflict is detected between an address of a memory access from another thread and the addresses tracked by the address tracking circuitry for the transaction; and for a second type of transaction started using a second type of transaction start instruction, the instruction decoder is configured to control the processing circuitry to respond to execution of a read operation within the transaction by marking an address of the read operation as trackable by the address tracking circuitry, and to respond to execution of a write operation within the transaction by omitting marking of an address of the write operation as trackable by the address tracking circuitry.

Also described herein there is a data processing method comprising: decoding instructions using an instruction decoder; performing data processing in response to the decoded instructions using processing circuitry of an apparatus comprising transactional memory support circuitry to support execution of a transaction within a thread of data processing by the processing circuitry, the transactional memory support circuitry comprising address tracking circuitry to track addresses accessed by instructions within the transaction, in which for a first type of transaction started using a first type of transaction start instruction, the instruction decoder is configured to control the processing circuitry to prevent commitment of results of instructions executed speculatively following the first type of transaction start instruction until a transaction end instruction is reached, in which the transactional memory support circuitry is configured to trigger an abort of the transaction in response to detecting a conflict between an address of a memory access from another thread and the addresses tracked by the address tracking circuitry for the transaction; and controlling the processing circuitry, by the instruction decoder in response to a second type of transaction started using a second type of transaction start instruction, to respond to execution of a read operation within the transaction by marking an address of the read operation as trackable by the address tracking circuitry, and to respond to execution of a write operation within the transaction by omitting marking of an address of the write operation as trackable by the address tracking circuitry.

Also described herein there is a computer program for controlling a host data processing apparatus to provide an instruction execution environment for execution of instructions, comprising: instruction decoding program logic to decode instructions of target code to control the host data processing apparatus to perform data processing; transactional memory support program logic to support execution of a transaction within a thread of data processing, the transactional memory support program logic comprising address tracking program logic to track addresses accessed by instructions within the transaction, in which for a first type of transaction started using a first type of transaction start instruction, results of instructions executed speculatively following the first type of transaction start instruction are prevented from being committed until a transaction end instruction is reached, and the transactional memory support program logic is configured to trigger an abort of the transaction in response to detecting a conflict between an address of a memory access from another thread and the addresses tracked by the address tracking program logic for the transaction; and in response to a second type of transaction started using a second type of transaction start instruction, the instruction decoding program logic is configured to control the transactional memory support program logic is configured to respond to execution of a read operation within the transaction by marking an address of the read operation as trackable by the address tracking program logic, and to respond to execution of a write operation within the transaction by omitting marking of an address of the write operation as trackable by the address tracking program logic.

Also described herein there is a storage medium storing the computer program.

The present invention will be described further, by way of example only, with reference to embodiments thereof as illustrated in the accompanying drawings, in which.

Before discussing the embodiments with reference to the accompanying figures, the following description of embodiments is provided.

In accordance with one example configuration there is provided an apparatus capable of supporting a first type of transaction started using a first type of transaction start instruction and a second type of transaction started using a second type of transaction start instruction. Following the second type of transaction start instruction, addresses of read operations are marked as trackable whilst addresses of write operations are omitted from being marked as trackable.

It may be seen as counter-intuitive to contemplate not tracking writes for a transaction, as this would at first glance appear to completely defeat the very purpose of transactions, which may be to provide an atomically indivisible set of operations for ensuring exclusive access to shared resources. However, the inventors recognised that transactions can also be used for other purposes, where a guarantee of exclusive access by the transaction may not be required.

For example address watching is a technique for enabling software executing on one thread to detect when a particular memory address is updated by another thread or another processor core. One approach to implementing address watching is polling, where the software executing on a thread has to repeatedly read the address to check whether it has changed, but this is slow and power intensive. In another approach the architecture can provide automatic (non-polling) monitoring of a single address, by executing a load exclusive instruction to set an "exclusive" status for a particular address. Exclusive monitor hardware is provided to monitor accesses by other threads or cores and remove the exclusive status when a write to the address marked as exclusive is detected. A subsequent store exclusive instruction fails if the exclusive status has been removed from the target address, and the original software can use this to find out if the address had been written to. However, this approach does not scale well to polling multiple addresses simultaneously and so most architectures restrict setting of exclusive status to only one address at a time. An alternative approach is to use a mapping or virtual mail box, where a single address watched in hardware is used as a mailbox which indicates whether a group/range of other addresses has been updated. With this approach, the other software which updates one of the addresses also has to update the virtual mailbox address to signal that an update has been carried out. The thread which is to be notified of the update is then interrupted when the mailbox address is updated, but then in order to determine which other address was the one actually updated by the other software, each address in this number or range would still need to be polled individually by the interrupted thread. Hence, these approaches to address watching do not scale well with increasing numbers of addresses to be watched.

The inventors realised that in a system supporting transactional memory, there is already logic for monitoring accesses to multiple addresses and interrupting software processing when one of these addresses is accessed, namely the conflict detection logic for detecting when to abort the transaction. Accordingly multiple address watching can be implemented with relatively little additional hardware. It was further realised that entering the first type of transaction is unnecessarily computationally intensive when only used for address watching, since the addresses of all read and write operations need to be tracked. Accordingly, it was realised that it can be more efficient to provide an apparatus which can support a second type of transaction, where addresses of the read operations are marked as trackable but write addresses are omitted from being marked as trackable, which provides an apparatus capable of watching multiple addresses without the full computational burden of the first type of transaction.

In some example configurations for the first type of transaction, the transactional memory support circuitry is configured to trigger capture of architectural state to be restored on aborting the transaction; and for the second type of transaction, the transactional memory support circuitry is configured to omit the capture of the architectural state. This allows restoration state to be captured and used in the event of an abort of the first type of transaction, but its capture to be omitted for the second type of transaction, thereby reducing the overhead and processing delay in starting the second type of transaction.

In some example configurations for the first type of transaction, following the transaction end instruction the instruction decoder is configured to control the processing circuitry to discard the captured architectural state or allow it to be overwritten subsequently. By reaching the transaction end instruction, the first type of transaction will have successfully executed, and thus the architectural state will not need to be restored. By discarding the captured architectural state, memory or register space can be freed up for other processing operations.

In some example configurations for the second type of transaction the transactional memory support circuitry is configured to trigger an abort of the transaction when a conflict is detected between the address of the read operation executed within the transaction and an address of a write operation from another thread. Hence, this provides a means of stopping the transaction when a conflict is detected. In particular in this case, the conflict is between the address of the read operation executed within the transaction and an address of a write operation from another thread; in other words when another thread is attempting to write to one of the addresses in the transaction which has been marked as trackable. In contrast, for the first type transaction, the conflict could be between a read operation in the transaction and a write operation from another thread or between a write operation in the transaction and a read operation from another thread.

In some example configurations the transactional memory support circuitry is configured to trigger the abort of the second type of transaction in response to at least one other event. For example, another event which could trigger the abort could be a system reset, an interrupt, execution of an instruction which is not allowed to be executed within a transaction, or insufficient storage. This provides numerous different mechanisms for triggering an abort as well as a conflict.

In some example configurations for the second type of transaction, the instruction decoder is configured to control the processing circuitry to omit restoration of architectural state in response to the abort. For the second type of transaction, write addresses are not marked as having been accessed by the transaction, but the architectural state may still change during the transaction (e.g. any load or arithmetic instruction could update architectural state in the registers of the core on which the transaction is executing). However, the second type of transaction is not being used for ensuring atomic treatment of a set of operations as in normal transactional memory, but is instead being used for address watching where there is no requirement for a set of operations to complete atomically. Accordingly, if the second type of transaction is aborted there is no need to restore previous state as the results of any intervening instructions are still valid. Omitting the restoration step therefore reduces the computational burden (and processing delay) following abort of the transaction and increases the processing efficiency.

In some example configurations for the second type of transaction, the processing circuitry is configured to at least one of: commit results of intervening instructions of the transaction in response to the abort of the second type of transaction; or commit results of instructions inside the second type of transaction without waiting for the transaction end instruction. Unlike the first type of transaction, for the second type intervening results may be valid even if there is an abort. Hence, it is fine to commit on abort, or simply to commit any intervening results as and when throughout the transaction without waiting for a transaction end instruction. Committing results of instructions inside the second type of transaction without waiting for the transaction end instruction means that intervening results do not needed to be buffered up in a buffer, which is more energy efficient. Committing results of intervening instructions of the transaction in response to the abort of the second type of transaction means that handling of the second type of transaction is more similar to handling of the first type of transaction, so fewer control modifications are needed.

In some example configurations for the second type of transaction, the instruction decoder is responsive to a predetermined type of instruction to control the processing circuitry to pause processing of instructions until a notification is received that the abort has been triggered. This puts the processing circuitry into a watch configuration, wherein no further operations are processed within the transaction until an abort is triggered, thereby providing a low overhead (e.g. low power) means of address tracking.

In some example configurations the predetermined type of instruction specifies a register to store an address indication indicative of the address of the memory access from the other thread that triggered the abort. This provides a means of recording the address of the memory access which triggered the abort.

In some example configurations, in response to the abort of the second type of transaction being triggered, the processing circuitry is configured to store an abort cause indication indicative of whether the abort was triggered by a conflict. This provides a means of recording the cause of the abort, which can be useful for the thread to decide whether the abort really was caused by an update to one of the tracked addresses, or for some other reason (such as an interrupt). This helps software decide how to continue processing after the transaction aborts.

In some example configurations the predetermined type of instruction specifies a register to store an address indication indicative of the address of the memory access from the other thread that triggered the abort. This allows software to determine which particular address among the multiple addresses being tracked was updated, and respond accordingly. This avoids the need to poll each of the multiple addresses being tracked in order to find out which address was updated, as in the alternative approaches discussed above.

In some example configurations the abort cause indication is stored in the same register as the address indication. This allows the cause of the abort and the address of the memory access which triggered the abort to be recorded in the same location, allowing easy access by other processing operations. It might be expected that memory addresses should be the same width as register, so it may be seen as counter intuitive to also have room for the abort cause indication in the same register. However, because of address alignment constraints, which may require memory addresses to be aligned to a certain size number of bytes, a lower portion of the address may always be all 0s and so could be reused to specify the abort cause indication. Alternatively, some architectures may not fully use the entire address space (e.g. only using 48 bits of a potential 64-bit address space), so there may be spare bits at the top that could be used to provide the abort cause indication. Having only one destination register to be updated by the instruction may be simpler to implement in microarchitecture, and results in less register pressure in use of registers.

However, in other examples the abort cause indication may be stored in a general purpose register separate to the address indication. An advantage of this approach can be that the address indication provided in the register may be used directly to trigger a further memory access without first having to mask out the abort cause indication.

In some example configurations the apparatus comprises a control register to store at least one condition status indication indicative of a property of a previous processing result; in which: in response to a conditional instruction, the instruction decoder is configured to control the processing circuitry to perform a conditional operation conditional on whether the at least one condition status indication stored in the control register satisfies a test condition; and the abort cause indication comprises at least one of said at least one condition status indication. Hence, the abort cause indication could be recorded directly to the condition status indication(s) which can be directly tested by a conditional instruction, hence reducing the number of processing steps that are required following the abort, since abort cause indication is used as an input into the conditional operation without needing an intervening compare instruction to test the abort cause indication and set up condition status indications accordingly.

A corresponding computer program may control a host data processing apparatus to provide an instruction execution environment for execution of instructions, in which processing program logic is responsive to the second type of transaction start instruction to mark addresses of read operations as trackable whilst omitting marking of addresses of write operations as trackable. Such a computer program may allow a generic host data processing apparatus which does not itself have the transactional memory support circuitry or the instruction decoder support for the first or second type of transaction start instruction to benefit from the transactional memory functionality and the address watching capability of the second type of transaction, even though there may be no actual hardware providing these features. Instead the computer program provides program logic, such as sets of instructions or data structures, which emulate this functionality, enabling the generic host data processing apparatus to execute code intended for execution on an apparatus which does provide such hardware features.

Particular embodiments will now be described with reference to the figures.

Figure 1:
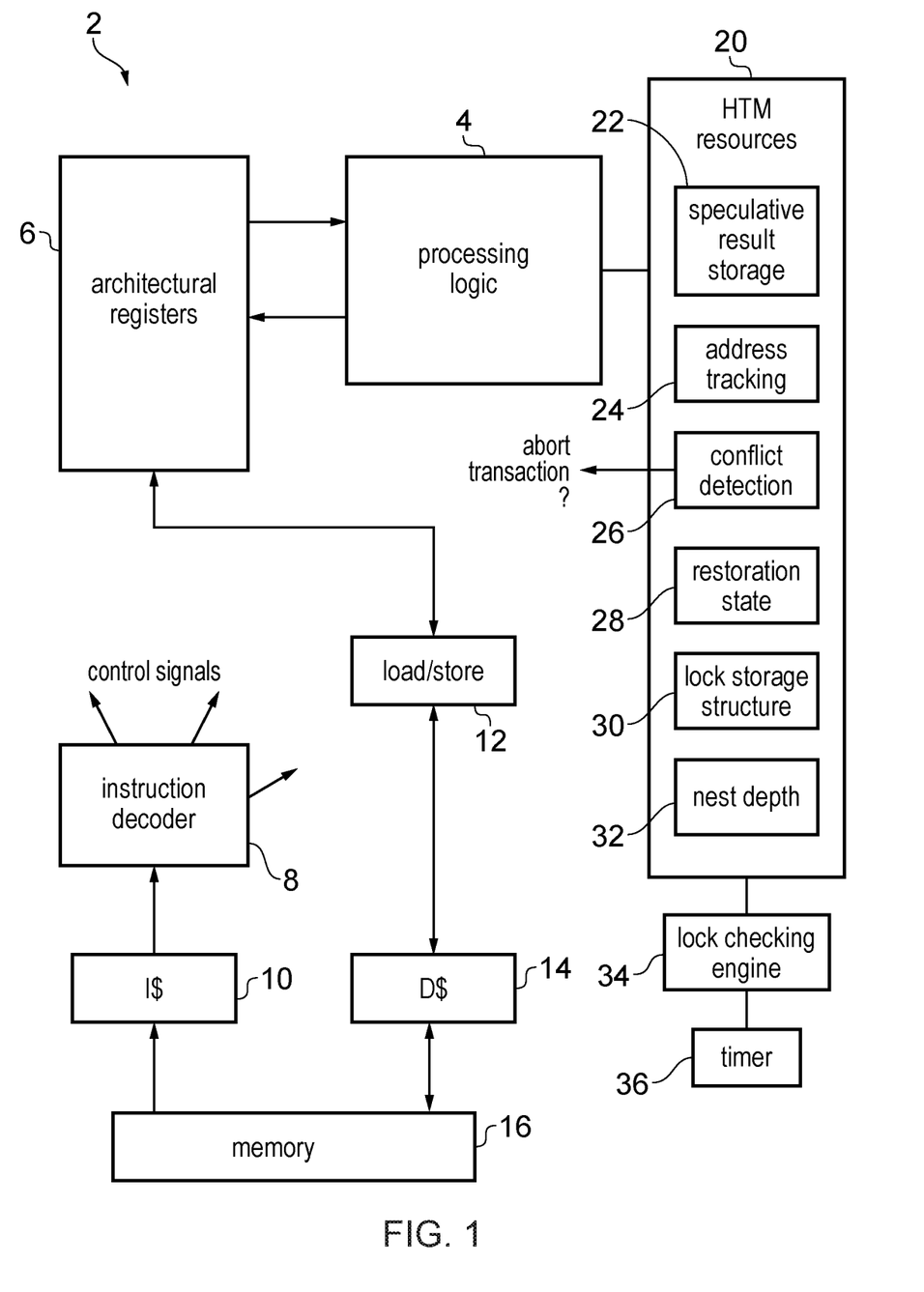
FIG. 1 schematically illustrates an example of data processing apparatus having transactional memory support circuitry.

FIG. 1 illustrates an example of a data processing apparatus 2 with hardware transactional memory (HTM) support. The apparatus has processing circuitry (processing logic) 4 for executing instructions to carry out data processing operations. For example the processing circuitry 4 may include execution units for executing various types of processing operations, such as an arithmetic/logic unit (ALU) for carrying out arithmetic or logical operations such as add, multiply, AND, OR, etc.; a floating-point unit for performing operations on floating point operands; or a vector processing unit for carrying out vector processing on vector operands comprising multiple data elements. A set of architectural registers 6 is provided for storing operands for the instructions executed by the processing circuitry 4 and for storing the results of the executed instructions. An instruction decoder 8 decodes instructions fetched from an instruction cache 10 to generate control signals for controlling the processing circuitry 4 or other elements of the data processing apparatus 2 to perform the relevant operations. A load/store unit 12 is also provided to perform load operations (in response to load instructions decoded by the instruction decoder 8) to load a data value from a data cache 14 or main memory 16 into the architectural registers 6, and store operations (in response to store instructions decoded by the instruction decoder 8) to store a data value from the architectural registers 6 to the data cache 14 or memory 16.

The apparatus 2 also has transactional memory support circuitry 20 which provides various resources for supporting hardware transactional memory (HTM). The HTM resources in the transactional memory support circuitry 20 may include for example speculative result storage 22 for storing speculative results of transactions, address tracking circuitry 24 for tracking the addresses accessed by a transaction, conflict detection circuitry 26 for detecting conflicts between data accesses made by a transaction and data accesses made by other threads, so that a transaction can be aborted when a conflict is detected, and restoration state storage circuitry 28 for storing a snapshot of the architectural state data from the architectural registers 6 at the start of a transaction, so that this state can be restored to overwrite the speculative results of the transaction when a transaction is aborted. Also, the resources may include a lock storage structure 30 for strong lock identifiers and a nesting depth register 32 for storing a nesting depth value tracking a level of nesting of transactions, which will be described in more detail later.

Figure 2:
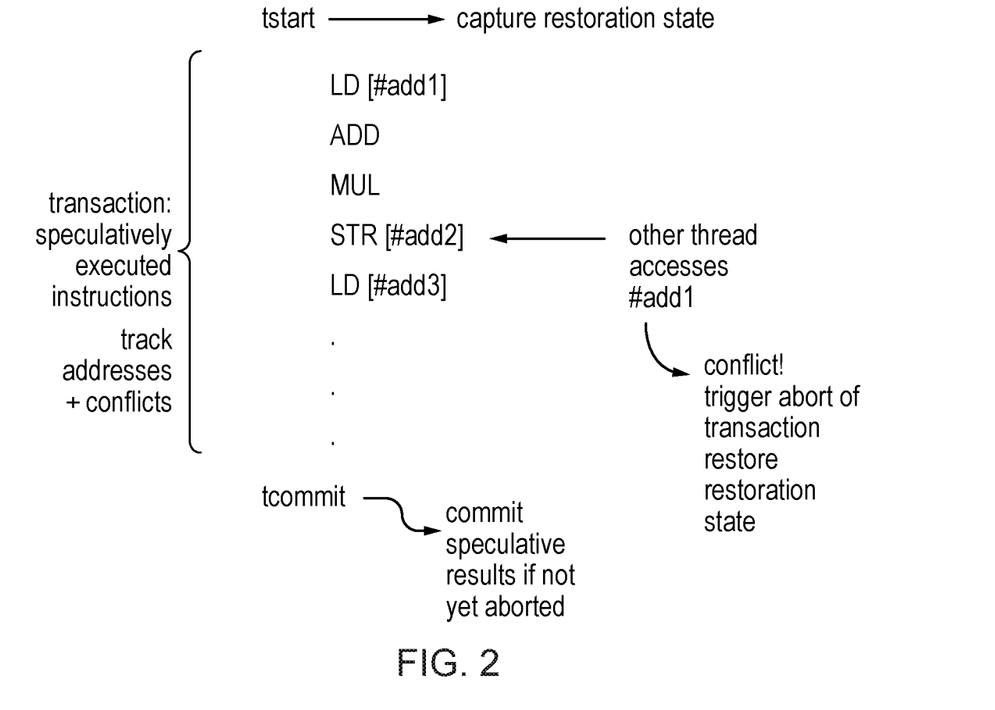
FIG. 2 illustrates an example of processing of a first transaction in a system with transactional memory support.

FIG. 2 shows an example of executing a first type of transaction within a given thread using the transactional memory support circuitry 20 and the processing circuitry 4. The first type of transaction is a section of program code which is bounded by a first type of transaction start instruction (tstart) and a transaction end instruction (tcommit) As shown in FIG. 2, in response to the first type of transaction start instruction the current architectural state in the architectural registers 6 is captured and stored in the restoration state storage circuitry 28. The processing circuitry 4 begins to perform speculative execution of the subsequent instructions following the tstart instruction, and as these instructions are executed, the addresses accessed by those instructions are tracked by the address tracking circuitry 24, and the conflict detection circuitry 26 detects conflicts between the tracked addresses and addresses of made accesses using the load/store unit 12 in response to other threads. At least some speculative results of the instructions within the transaction are stored within the speculative result storage circuitry 22. For example the value stored the cache or to memory in response to a store instruction STR may be held in the speculative result storage 22 while the transaction remains pending. If the transaction end instruction (tcommit) is reached without an abort event occurring in the meantime, then in response to the transaction end instruction the speculative results are committed. On committing the transaction, any results stored in the speculative results storage 22 for that thread may be written to the data cache 14 or memory 16 and the captured architectural state restoration state 28 can be discarded or permitted to be overwritten as it is no longer needed to rewind architectural state to the point before the first type of transaction start instruction was encountered.

On the other hand, if an abort event occurs, for example when a conflict is detected by the conflict detection circuitry 26 when another thread accesses an address already accessed by the transaction, then an abort of the transaction is triggered and the captured architectural state from the restoration state storage 28 is restored to the architectural registers 6. Other causes of an abort event could for example include execution of an instruction which is not allowed to be executed within a transaction, insufficient resource within the speculative result storage 22 or an address tracking circuitry 24 for handling the speculative results or addresses required by a given transaction, or an interrupt being received during the transaction.

Figure 3:
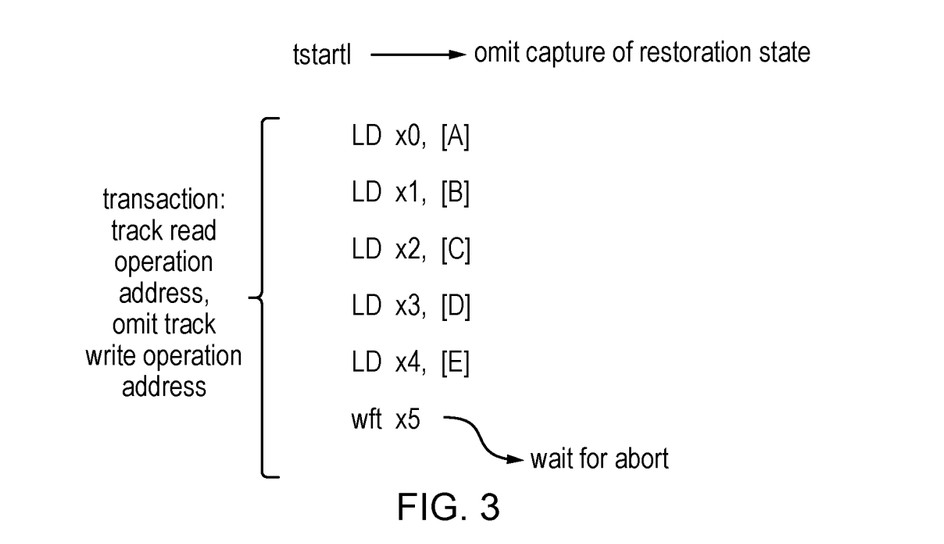
FIG. 3 illustrates an example of processing of a second transaction in a system with transactional memory support.

FIG. 3 shows an example of executing a second type of transaction within a given thread using the transactional memory support circuitry 20 and the processing circuitry 4. The second type of transaction is a section of program code which begins with a second type of transaction start instruction. In the example in FIG. 3 the second type of transaction start instruction is a specific instruction (start1). Alternatively, a flag previously set in a control register can be used to signal whether a transaction start instruction is of the first type or the second type. As shown in FIG. 3, in response to the second type of transaction start instruction the processing circuitry 26 responds to execution of a read operation (such as Load instructions LD x0, [A] to LD x4, [E]) within the transaction by marking an address of the read operation (e.g. addresses [A] to [E] shown in FIG. 3) as trackable by the address tracking circuitry 24. In contrast to the first type of transaction, the processing circuitry 26 responds to execution of a write operation within the transaction by omitting marking of an address of the write operation as trackable by the address tracking circuitry 24. In other words on encountering a store instruction such as STR[#add2] in the example of FIG. 3, the write flag for the memory address is not marked.

As illustrated in FIG. 3, the transactional memory support circuitry 20 can also be configured to omit the capture of the architectural state for the second type of transaction. In other words, for the second type of transaction, the instructions following the tstart1 instruction are performed without capturing the architectural state that would be captured for the first type of transaction start instruction tstart shown in FIG. 2.

If a conflict is detected by the conflict detection circuitry 26 when another thread writes to an address already tracked as part of the read set of the second type of transaction, then the transactional memory support circuitry 20 is configured to trigger an abort of the second type of transaction. The transactional memory support circuitry can also be configured to trigger the abort of the second type of transaction in response to at least one other event, for example execution of an instruction which is not allowed to be executed within a transaction, a system reset, insufficient resource within the speculative result storage 22 or an address tracking circuitry 24, or an interrupt being received during the transaction. In response to the abort of the second type of transaction the processing circuitry 4 may be configured to perform various different actions. For example the processing circuitry 4 may be configured to commit results of intervening instructions of the transaction in response to the abort of the second type of transaction. Alternatively or in addition the processing circuitry 4 may be configured to commit results of instructions inside the second type of transaction without waiting for the transaction end instruction. Alternatively or in addition the processing circuitry 4 may be configured to store an abort cause indication indicative of whether the abort was triggered by a conflict.

FIG. 3 also illustrates a predetermined type of instruction (wft) for use with the second type of transaction. In response to the wft instruction, the processing circuitry pauses processing of instructions until a notification is received that an abort has been triggered. In other words, processing of instructions in the transaction is paused until there is an abort, for example caused by a conflict between an address which has been marked as trackable and a write operation from another thread. As illustrated in FIG. 3 the wft instruction specifies a register x5 to store an address indication indicative of the address of the memory access from the other thread that triggered the abort. This indication may be an indication of a first address in a set rather than the individual address which triggered the abort. When the processing circuitry 4 stores an abort cause indication in response to an abort, this abort cause indication can be stored in the same register as the address indication. Alternatively the abort cause indication can be stored in a general purpose register separate to the address indication, for example in a status register.

The apparatus 2 can also comprise a control register to store at least one condition status indication indicative of a property of a previous processing result. In response to a conditional instruction the instruction decoder 8 is configured to control the processing circuitry 4 to perform a conditional operation conditional on whether the at least one condition status indication stored in the control register satisfies a test condition. The abort cause indication then comprises at least one of said at least one condition status indication.

Figure 4:
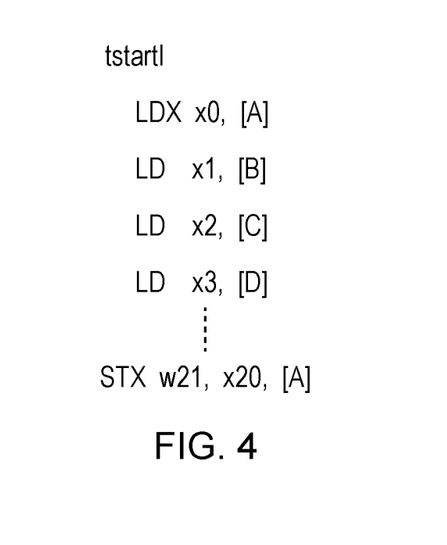
FIG. 4 illustrates another example of processing of a second transaction in a system with transactional memory support.

FIG. 4 shows another example of executing a second type of transaction within a given thread using the transactional memory support circuitry 20 and the processing circuitry 4. As with the example illustrated in FIG. 3, the second type of transaction begins with a second type of transaction start instruction (start1). In response to the second type of transaction start instruction the processing circuitry 26 responds to execution of a read operation within the transaction by marking an address of the read operation as trackable by the address tracking circuitry 24 and omitting marking of an address of the write operation as trackable by the address tracking circuitry 24. Additionally, the transactional memory support circuitry 20 can also be configured to omit the capture of the architectural state. Following the second type of transaction start instruction in FIG. 4 there is a load-exclusive (LDX) instruction and a store-exclusive (STX) instruction. The load and store exclusive instructions can be used to split the operation of atomically updating memory into two separate steps whilst also proving atomic updates in conjunction with exclusive monitors that track exclusive memory accesses. This is further described below with reference to FIG. 5. Prior to the store exclusive instruction there may be other operations (as indicated by the ellipsis) such as regular (non-exclusive) load and store instructions.

Figure 5:
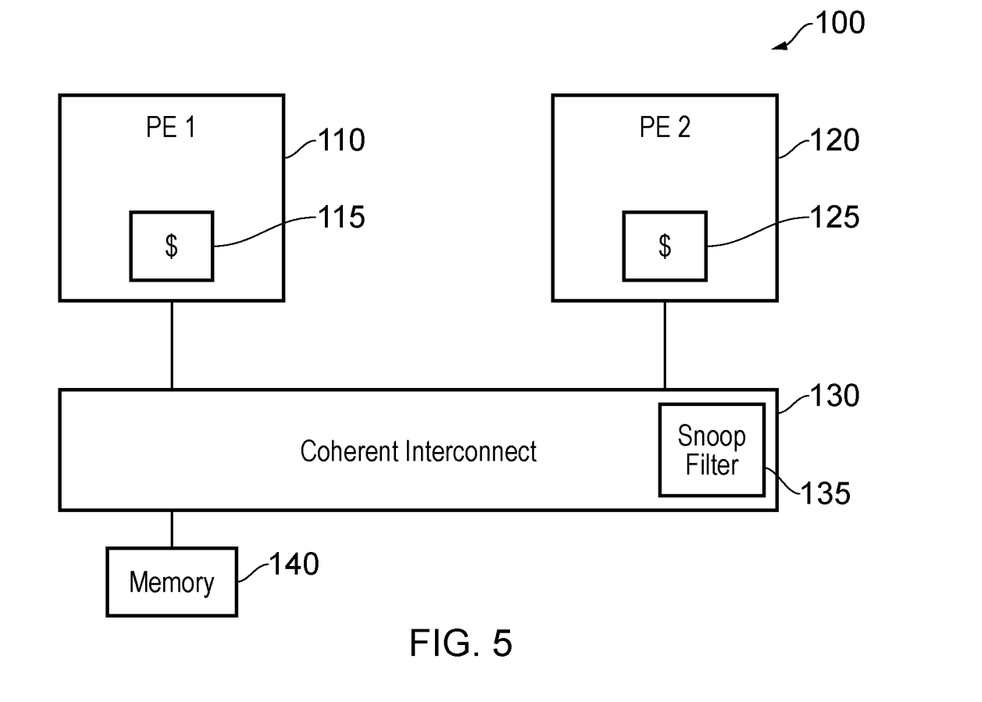
FIG. 5 schematically illustrates an example of a system comprising two or more processor cores and a cache coherent interconnect.

FIG. 5 schematically illustrates an example of a cache coherent interconnection system 100. The illustrated system comprises two processing elements 110, 120, each with its own local cache 115, 125. Although only two processing elements 110, 120 are illustrated in FIG. 5 it will be appreciated that more processing elements may be provided. The memory 140 is shared between the processing elements 110, 120 and the coherent interconnect 130 maintains coherency between the processing elements 110, 120 and the memory 130. Also illustrated in FIG. 5 is a snoop filter 135. In FIG. 5 the snoop filter 135 is illustrated as being situated on the coherent interconnect 130, but this is not essential and the snoop filter may be provided as a separate element connected to the processing elements 110, 120 via the coherent interconnect 130. Alternatively the snoop filter may form part of one of the processing elements 110, 120. In the system illustrated in FIG. 5 the snoop filter 135 acts as an exclusive monitor for tracking exclusive accesses to memory regions marked as shareable. Alternatively, an exclusive monitor may be implemented as separate circuitry between the processing elements 110, 120 and the memory 130 and operate by allocating an address for each processing element 110, 120 that supports exclusive accesses.

A load-exclusive (LDX) operation on the first processing element 110 specifies a destination register (x0 in FIG. 4) to be written with the loaded value, and in addition to the load causes the target address ([A] in FIG. 4) of the load-exclusive operation to be tagged as exclusive to the first processing element 110, for example in the cache, in the snoop filter or in a separate exclusive monitor. If the second processing element 120 executes a store to the address [A] marked as exclusive to the first processing element 120, the exclusive status is removed. It will be appreciated that there may be other events that could also lead to the exclusive status being removed. The store-exclusive (STX) instruction specifies a target address ([A] in FIG. 4), a source register (x20 in FIG. 4) from which data is to be stored to the target address, and a destination register (w21 in FIG. 4) to which a value is to be written indicating whether the store was successful. In response to the store-exclusive instruction executed by the first processing element 110, it is checked whether the exclusive monitor is set for the target address [A] mentioned by the store-exclusive instruction. If the exclusive monitor is still set, the store is successful and the destination register w21 is set to a pass indication. If the exclusive monitor not still set for the target address [A], the store is not carried out and the destination register w21 is set to a fail indication.

The example of FIG. 4 can be useful in cases where the address [A] represents a pointer to a data structure at addresses [B], [C], [D]. A number of updates can be performed based on the values read from addresses [B], [C], [D], and non-exclusive store instructions could be used to store updated values to a separate address range (different from the addresses [B]-[D]). The transaction mechanisms (including the address watching and conflict detection logic) provided in hardware may ensure that if another thread updates one of addresses [B]-[D] when the transaction has not yet completed, then the transaction is aborted and the store exclusive not carried out. However, if the transaction reaches the store-exclusive instruction without any such abort, then the store-exclusive instruction can update the pointer stored at address [A] to point to the new data structure, swinging the pointer across so that the new data structure takes effect atomically, but through the use of the tstart1 instruction in combination with the LDX/STX pair of instructions, this can be achieved without needing to incur the delay associated with saving/restoring restoration state as would be the case if the first type of transaction start instruction was used. Hence, the pointer at [A] will only be changed if the set of addresses [B]-[D] in the original data structure have not been altered, and thus that the indication associated with the store-exclusive instruction indicates that the store-exclusive instruction was successful.

Figure 6:
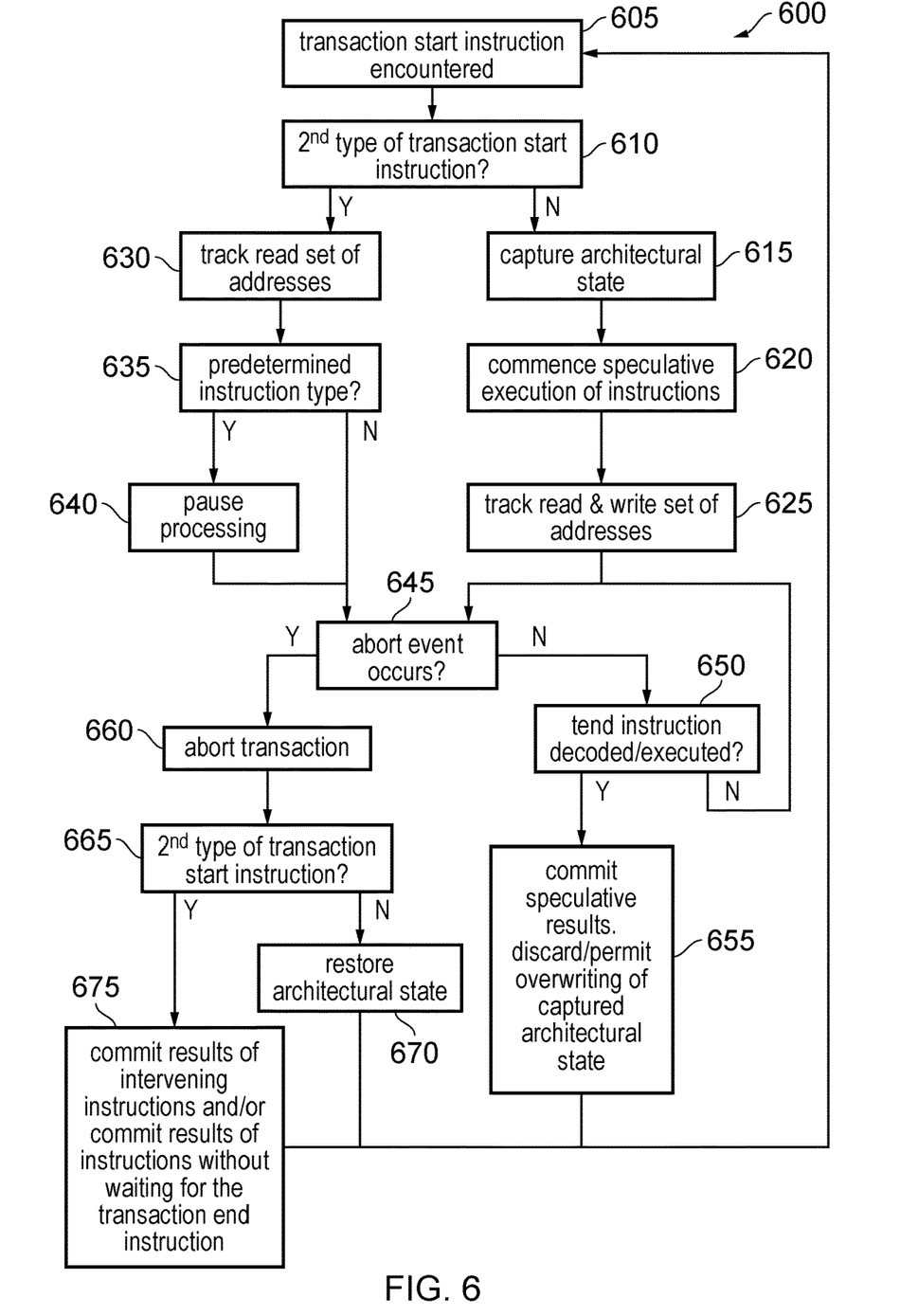
FIG. 6 is a flow diagram showing processing of an example of a transaction.

FIG. 6 is a flow diagram illustrating a method 600 of processing transactions. At step 605 a transaction start instruction, such as tstart or start1 described above, is decoded and executed. At step 610 it is determined whether the transaction start instruction is of the first type (tstart) or the second type (tstart1). If the transaction start instruction is of the first type, the method continues to step 615, where the architectural state is captured. The method then continues to step 620 where speculative execution of instructions in the transaction is commenced, including tracking of the read and write set of addresses (step 625). The method then continues to step 645. If it is determined at step 610 that the transaction start instruction is of the second type, the method continues to step 630, where the read set of addresses are tracked during execution of instructions in the transaction. At step 635, it is determined whether the predetermined instruction type (wft) is encountered during execution of instructions in the transaction. If the predetermined instruction type is encountered the method continues to step 640, where further processing of instructions is paused. The method then continues to step 645. If the predetermined instruction type is not encountered, instructions in the transaction continue to be executed and the method continues directly to step 645. At step 645, it is determined where an abort event has occurred. If an abort event has not occurred, the method continues to step 650, where it is determined whether a transaction end (tend) instruction has been encountered (in other words if a tend instruction has been decoded and executed). If a transaction end instruction has not been encountered, the method returns to step 645. If a transaction end instruction has been encountered, the method continues to step 655, where the speculative results from the transaction are committed and the captured architectural state is permitted to be overwritten, since it is no longer required for this transaction. The method then returns to step 605 in preparation for the next transaction start instruction to be received. If at step 645 it is determined that an abort event has been encountered, the method continues to step 660, where in the transaction is aborted. At step 665 it is again determined whether the transaction start instruction encountered was of the first or second type (in other words, whether the transaction is of the first type or the second type). If it is determined that the transaction start instruction encountered was not of the second type (in other words, it was of the first type) the method continues to step 670, where the captured architectural state is restored. The method then returns to step 605 in preparation for the next transaction start instruction to be received. If at step 665 it is determined that the transaction start instruction encountered was the second type, the method continues to step 675, where results of intervening instructions are committed and/or results of instructions are committed without waiting for a transaction end instruction. The method then returns to step 605 in preparation for the next transaction start instruction to be received. It will be appreciated that whilst the method 600 illustrated in FIG. 6 is shown as a closed loop, the method can be carried out with a single transaction, wherein the method will terminate at one of steps 655, 670 or 675.

Figure 7:
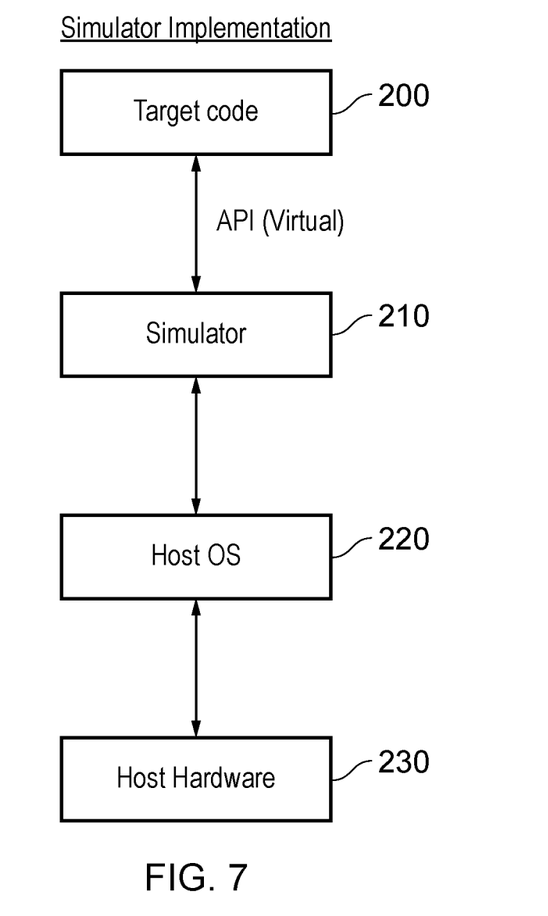
FIG. 7 illustrates a simulator embodiment that can be used.

FIG. 7 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 230, optionally running a host operating system 220, supporting the simulator program 210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 230), some simulated embodiments may make use of the host hardware, where suitable.

The simulator program 210 may be stored on a computer-readable storage medium (which may be a non-transitory medium), and provides a program interface (instruction execution environment) to the target code 200 (which may include applications, operating systems and a hypervisor) which is the same as the application program interface of the hardware architecture being modelled by the simulator program 210. Thus, the program instructions of the target code 200, including the first and second types of transaction start instruction described above, may be executed from within the instruction execution environment using the simulator program 210, so that a host computer 230 which does not actually have the hardware features of the apparatus 2 discussed above can emulate these features.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
an instruction decoder to decode instructions;
processing circuitry to perform data processing in response to the instructions decoded by the instruction decoder;
transactional memory support circuitry to support execution of a transaction within a thread of data processing by the processing circuitry, the transactional memory support circuitry comprising address tracking circuitry to track addresses accessed by instructions within the transaction;
for a first type of transaction started using a first type of transaction start instruction, the instruction decoder is configured to control the processing circuitry to prevent commitment of results of instructions executed speculatively following the first type of transaction start instruction until a transaction end instruction is reached, in which the transactional memory support circuitry is configured to trigger an abort of the first type of transaction when a conflict is detected between an address of a memory access from another thread and the addresses tracked by the address tracking circuitry for the first type of transaction; and
for a second type of transaction started using a second type of transaction start instruction, the instruction decoder is configured to control the processing circuitry to respond to execution of a read operation within the second type of transaction by marking an address of the read operation as trackable by the address tracking circuitry, and to respond to execution of a write operation within the second type of transaction by omitting marking of an address of the write operation as trackable by the address tracking circuitry;
wherein for the second type of transaction the transactional memory support circuitry is configured to trigger an abort of the second type of transaction when a conflict is detected between the address of the read operation executed within the second type of transaction and an address of a write operation from another thread, and
for the second type of transaction, the instruction decoder is configured to control the processing circuitry to omit restoration of architectural state in response to the abort of the second type of transaction, where the architectural state for which the restoration is omitted includes architectural state that is changed during the transaction.

2. The apparatus according to claim 1, wherein for the first type of transaction, the transactional memory support circuitry is configured to trigger capture of architectural state to be restored on aborting the first type of transaction; and
wherein, for the second type of transaction, the transactional memory support circuitry is configured to omit the capture of the architectural state.

3. The apparatus according to claim 2, wherein for the first type of transaction, following the transaction end instruction the instruction decoder is configured to control the processing circuitry to discard the captured architectural state or allow the captured architectural state to be overwritten.

4. The apparatus according to claim 1, wherein the transactional memory support circuitry is configured to trigger the abort of the second type of transaction in response to at least one other event.

5. The apparatus according to claim 1, wherein for the second type of transaction, the processing circuitry is configured to at least one of:
commit results of intervening instructions of the second type of transaction in response to the abort of the second type of transaction; or
commit results of instructions inside the second type of transaction without waiting for the transaction end instruction.

6. The apparatus according to claim 1, wherein for the second type of transaction, the instruction decoder is responsive to a predetermined type of instruction to control the processing circuitry to pause processing of instructions until a notification is received that the abort of the second type of transaction has been triggered.

7. The apparatus according to claim 6, wherein the predetermined type of instruction specifies a register to store an address indication indicative of the address of the memory access from the other thread that triggered the abort of the second type of transaction.

8. The apparatus according to claim 1, wherein in response to the abort of the second type of transaction being triggered, the processing circuitry is configured to store an abort cause indication indicative of whether the abort of the second type of transaction was triggered by a conflict.

9. The apparatus according to claim 8, comprising a control register to store at least one condition status indication indicative of a property of a previous processing result; in which:
in response to a conditional instruction, the instruction decoder is configured to control the processing circuitry to perform a conditional operation conditional on whether the at least one condition status indication stored in the control register satisfies a test condition; and
the abort cause indication comprises at least one of said at least one condition status indication.

10. The apparatus according to claim 8, wherein for the second type of transaction, the instruction decoder is responsive to a predetermined type of instruction to control the processing circuitry to pause processing of instructions until a notification is received that the abort of the second type of transaction has been triggered; and
the predetermined type of instruction specifies a register to store an address indication indicative of the address of the memory access from the other thread that triggered the abort of the second type of transaction.

11. The apparatus according to claim 10, wherein the abort cause indication is stored in the same register as the address indication.

12. The apparatus according to claim 10, wherein the abort cause indication is stored in a general purpose register separate to the address indication.

13. A data processing method comprising:
decoding instructions using an instruction decoder;
performing data processing in response to the decoded instructions using processing circuitry of an apparatus comprising transactional memory support circuitry to support execution of a transaction within a thread of data processing by the processing circuitry, the transactional memory support circuitry comprising address tracking circuitry to track addresses accessed by instructions within the transaction, in which for a first type of transaction started using a first type of transaction start instruction, the instruction decoder is configured to control the processing circuitry to prevent commitment of results of instructions executed speculatively following the first type of transaction start instruction until a transaction end instruction is reached, in which the transactional memory support circuitry is configured to trigger an abort of the first type of transaction in response to detecting a conflict between an address of a memory access from another thread and the addresses tracked by the address tracking circuitry for the first type of transaction; and
controlling the processing circuitry, by the instruction decoder in response to a second type of transaction started using a second type of transaction start instruction, to respond to execution of a read operation within the second type of transaction by marking an address of the read operation as trackable by the address tracking circuitry, and to respond to execution of a write operation within the second type of transaction by omitting marking of an address of the write operation as trackable by the address tracking circuitry;
wherein for the second type of transaction, an abort of the second type of transaction is triggered when a conflict is detected between the address of the read operation executed within the second type of transaction and an address of a write operation from another thread, and
for the second type of transaction, restoration of architectural state is omitted in response to the abort of the second type of transaction, where the architectural state for which the restoration is omitted includes architectural state that is changed during the transaction.

14. A non-transitory storage medium storing a computer program for controlling a host data processing apparatus to provide an instruction execution environment for execution of instructions, comprising:
instruction decoding program logic to decode instructions of target code to control the host data processing apparatus to perform data processing;
transactional memory support program logic to support execution of a transaction within a thread of data processing, the transactional memory support program logic comprising address tracking program logic to track addresses accessed by instructions within the transaction, in which for a first type of transaction started using a first type of transaction start instruction, results of instructions executed speculatively following the first type of transaction start instruction are prevented from being committed until a transaction end instruction is reached, and the transactional memory support program logic is configured to trigger an abort of the first type of transaction in response to detecting a conflict between an address of a memory access from another thread and the addresses tracked by the address tracking program logic for the first type of transaction; and
in response to a second type of transaction started using a second type of transaction start instruction, the instruction decoding program logic is configured to control the transactional memory support program logic to respond to execution of a read operation within the second type of transaction by marking an address of the read operation as trackable by the address tracking program logic, and to respond to execution of a write operation within the second type of transaction by omitting marking of an address of the write operation as trackable by the address tracking program logic;
wherein for the second type of transaction the transactional memory support program logic is configured to trigger an abort of the second type of transaction when a conflict is detected between the address of the read operation executed within the second type of transaction and an address of a write operation from another thread, and
for the second type of transaction, the instruction decoding program logic is configured to control the transactional memory support program logic to omit restoration of architectural state in response to the abort of the second type of transaction, where the architectural state for which the restoration is omitted includes architectural state that is changed during the transaction.

* * * * *